United States Patent

[11] 3,633,968

[72] Inventor Isaac W. Sears, Jr.
 325 McClellan Blvd., Davenport, Iowa 52803
[21] Appl. No. 77,775
[22] Filed Oct. 5, 1970
[45] Patented Jan. 11, 1972

[54] SEAT FABRIC COVER FASTENER
 5 Claims, 7 Drawing Figs.
[52] U.S. Cl............................................. 297/458,
 5/353.2
[51] Int. Cl............................................. B60n 1/06,
 A47c 3/00, A47c 7/02
[50] Field of Search............................................. 297/452,
 457, 458; 5/353.2, 353.3; 160/392, 395

[56] References Cited
 UNITED STATES PATENTS
 3,273,178 9/1966 Baruth et al................. 297/457 X
 3,281,185 10/1966 Albinson et al.............. 297/452

FOREIGN PATENTS
 548,499 1/1955 Canada...................... 5/353.3
 1,201,822 1/1960 France...................... 5/353.2

*Primary Examiner*—Casmir A. Nunberg
*Attorney*—Henderson & Strom

ABSTRACT: An improved fastening device for securing a fabric cover to the frame of a contoured seat having a marginal channel. The device includes a guard member frictionally connected to the seat frame and covering the peripheral edge thereof, the guard member having a longitudinal ridge projecting into the channel and adapted to restrain a resilient retainer within the channel to secure the fabric cover to the frame.

Also an integral part of this invention is a method to secure a cover to a seat frame without puncturing the cover or the need for adhesives. The method includes attaching a flexible edge guard to the seat frame; placing the cover on the frame; tucking the edges of the cover within the marginal channel of the seat frame; and forcing a resilient retainer into the channel to wedge the cover between the frame and retainer and thereby draw the cover taut over the frame and secure the cover thereto.

PATENTED JAN 11 1972

3,633,968

INVENTOR.
ISAAC W. SEARS JR.
BY Henderson + Strom
ATTORNEYS

SEAT FABRIC COVER FASTENER

BACKGROUND OF THE INVENTION

This invention relates generally to the seat construction art, and more particularly to a device for securing a fabric cover to a contoured seat having a stamped metal, or molded fiber glass frame such as used on tractors, agricultural equipment, machines, and industrial equipment.

In constructing seats of the above type, a frame conforming to the desired contour of the seat is provided. Generally the seat will include a base having an integral back rest and may be further provided with arm rests or sides. For the sake of appearance and comfort, the frame is generally covered with a fabric which normally will cover a cushion disposed between the frame and the fabric.

Formerly, a spring steel ring, or the like, such as that illustrated in U.S. Pat. No. 1,213,674 was used to secure the cover to the frame. However, with the advent of contoured seats, this type of ring became obsolete since it lacked flexibility and it was operable only within a single plane.

Heretofore, the fabric cover was secured to a contoured seat frame with adhesives or a U-shaped band clamping the fabric to the frame. Neither of these arrangements were conductive to production line assemblage, nor were they found durable over long use. Likewise, drawing the fabric cover taut over the frame to remove all wrinkles therefrom was a tedious procedure with these arrangements.

The fastener device of this invention is adapted to connect the fabric cover to a contoured frame by means of a resilient, though flexible, retainer resiliently compressing the fabric against the frame. The retainer member is designed to provide a secure, though a resilient connection of the fabric to the frame to alleviate tearing of the fabric cover while providing the seat with a durable wrinkle free appearance. In addition, the method of this invention is directed toward production line assemblage of the seats and is adapted to inherently enhance drawing the fabric taut over the seat cushion and frame.

SUMMARY OF THE INVENTION

An improved fastening device for securing a cover to a contoured seat frame having a marginal channel, the device including an elongated guard member disposed over the edge of the frame and frictionally connected thereto to draw the peripheral edge of the cover thereover and into the marginal channel, the guard member having a longitudinal ridge projecting into the channel adjacent the inlet thereof; and an elongated resilient retainer member disposed within the channel and abutting the ridge of the guard member, the retainer member being flexible to conform to the contour of the frame and operable to resiliently compress the fabric cover against the inner wall of the channel for fastening purposes.

Also an integral part of this invention is the improved method of securing a fabric cover to a seat frame having a marginal channel including the steps of (1) attaching a flexible edge guard to the frame adjacent the peripheral edges thereof; (2) positioning the fabric cover on the frame; (3) tucking the edges of the cover within the channel; and (4) compressing the edges of the cover against the channel wall with a flexible and resilient retainer.

It is an object of this invention to provide an improved device for securing a fabric cover to a seat frame.

It is another object of this invention to provide a cover fastening device for a contoured seat, wherein the cover is compressed against the seat frame.

It is a further object of this invention to provide a seat cover fastening device adapted to increase the compressing forces securing the cover to the frame upon an increased pulling force on the cover.

It is still another object of this invention to provide a cover guard adapted for quick and easy attachment to a seat frame to cover the abrasive edge of the frame and protect the fabric cover from wear.

It is yet another object of this invention to provide a cover guard that is flexible to conform to the contour of a seat and is adaptable for use with all seats, regardless of their shape or contour.

Another object of this invention is to provide a flexible retainer that is capable of being resiliently locked within a channel to securely grip and compress a fabric cover against a seat frame.

A further object of this invention is to provide a novel method of securing a cover to a seat frame that is simple, expedient, and is adaptable to a production line.

Yet another object of this invention is to provide a seat cover fastening device that is simple to apply, economical to use, and is durable.

These objects and other features and advantages of this invention will become readily apparent upon referring to the following description, when taken in conjunction with the appended drawings.

DESCRIPTION OF THE PREFERRED EMBODIMENT

Figure 1:
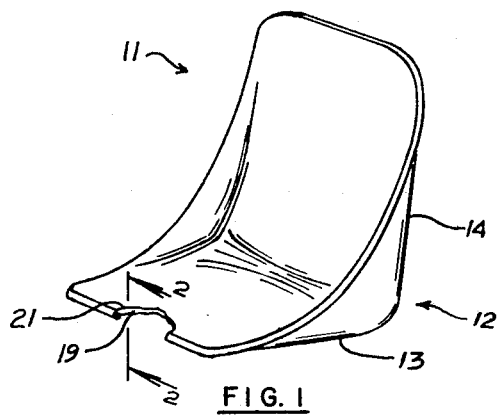
FIG. 1 is a perspective view of a contoured seat, with a portion thereof cut away to show the device of this invention in conjunction therewith.
Figure 2:
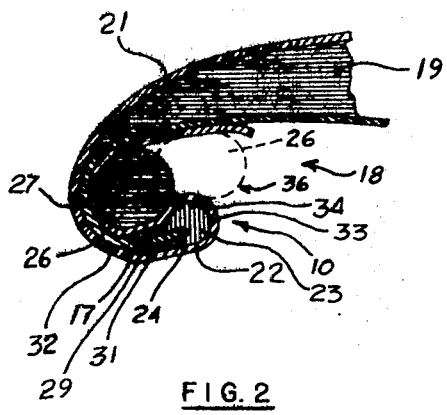
FIG. 2 is a cross-sectional view as taken along the line 2—2 of FIG. 1 showing the device of this invention in assembled position.

Referring now to the drawings, and particularly to FIGS. 1 and 2, the seat cover fastening device of this invention is indicated generally by the numeral 10. The fastening device 10 is shown in assembled relationship with a contoured seat 11 adapted for attachment to an agricultural implement (not shown), or the like.

The seat 11 includes a contoured frame 12 having an integrally formed base 13 and back rest 14. The frame is provided with a rolled peripheral flange 17 forming a marginal channel 18 extending the periphery of the frame 11.

The seat 11 (FIGS. 1 and 2) further includes a cushion 19 and a fabric cover 21 drawn taut thereover. The peripheral edge 22 of the cover 21 overlaps the peripheral flange 17 and is tucked within the channel 18 and secured to the frame 12 by the fastening device 10.

The fastening device 10 (FIG. 2) generally includes a guard 23 covering the peripheral edge 24 of the frame 12 and a retainer 26 restrained within the channel 18 by the guard 23 to resiliently compress the fabric cover 21 against the inner wall 27 of the channel 18, and secure the cover 21 to the frame 12.

The guard 23 is frictionally connected to the peripheral flange 17 of the frame 12 and includes an elongated, flexible extrusion having a longitudinal slot 28 formed therein to receive the peripheral edge 24 of the frame 12. Thus, in assembled position (FIG. 2), the guard 23 includes an inner member 29 frictionally engaging inner wall 27 of the channel 18 and outer member 31 frictionally engaging the outer wall 32 of the flange 17. The inner and outer members 29 and 31 are interconnected to form a curved edge 33 upon which the cover 21 is drawn over and into the channel 18 for securing purposes.

The guard 23 further includes a longitudinal ridge 34 coextensive with curved edge 33. The ridge 34 projects into the opening 36 of the channel 18 and serves to partially occlude the opening 36 to restrain the retainer 26 within the channel 18.

The retainer 26 is adapted to be inserted into the channel 18 for the purpose of retaining the cover 21 therein. Generally, the retainer 26 is an elongated, flexible member having resilient qualities, such that it may be constricted for insertion into the channel 18 through the opening 36, and once within the channel 18, to substantially recover its natural shape and compress the cover 21 against the inner wall 27 of the channel 18.

Figure 5:
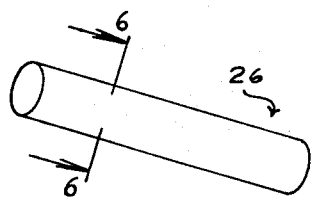
FIG. 5 is a perspective view of the retainer member.
Figure 6:
FIG. 6 is a cross-sectional view as taken along the line 6—6 of FIG. 5.
Figure 7:
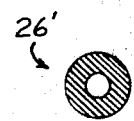
FIG. 7 is a cross-sectional view of a modification of the retainer member.

As best illustrated in FIGS. 2, 5 and 6, the retainer 26 is formed of a solid, resilient material, such as rubber, or the like, having a circular configuration in cross section. The diameter of the retainer 26 is designed to be slightly less than the diameter of the channel 18. FIG. 7 illustrates a modified retainer 26′ having a tubular configuration in cross section found to be equally satisfactory to secure the cover 21 to the frame 12.

Figure 3:
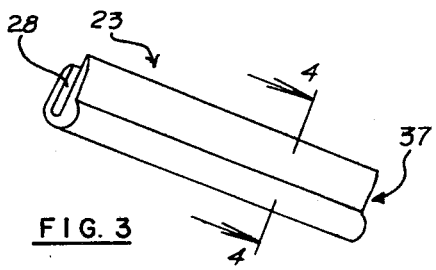
FIG. 3 is a perspective view of the guard member.
Figure 4:
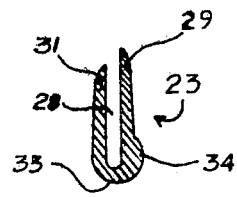
FIG. 4 is a cross-sectional view as taken along the line 4—4 of FIG. 3.

To assemble the seat 11 (FIGS. 1 and 2), the guard 23 is first placed over the peripheral edge 24 of the frame 12. This is easily accomplished by manually forcing one end 37 (FIG. 3) of the guard 23 over the edge 24 and progressively applying pressure from the end 37 along the axis of guard 23 until the entire peripheral edge 24 of the frame 12 is covered by the guard 23. The cushion 19 and fabric cover 21 are then positioned on the frame 12 and the overlapping edges 22 of the cover 21 are manually tucked within the channel 18. Once the cover 21 is relatively taut and wrinkle-free, the retainer 26 is forced within the channel 18 with a pincer tool, or the like.

As best illustrated by broken lines in FIG. 2, the retainer 26 necessarily compresses to fit within the opening 36 and thereby frictionally engages the edge 22 of the cover 21. As the retainer 26 is forced in the channel 18, the engaged edge 22 is likewise forced therein to inherently draw the cover 21 more taut over the frame 12.

An improved fastening device 10 for securing a fabric cover 21 to a seat frame 12 has thus been fully described that is economical, durable and easy to apply. The flexibility of the fastening device 10 enables it to conform to any desired contour of seat while its resiliency inherently facilitates drawing the cover 12 more taut, in addition to securely fasten the cover 21 to the seat frame 12 and reduce the opportunity of tearing the cover 21.

Although a preferred embodiment and one modification of the fastening device 10 of this invention has been hereinbefore fully described, it is to be remembered that various modifications can be made thereto without departing from the invention as hereinafter defined.

I claim:

1. A fastening device for securing a fabric cover to a contoured seat frame having a rolled peripheral flange defining a marginal channel, the fastening device comprising:

guard means frictionally connected to the frame and covering the peripheral edge thereof, said guard means having a curved edge for drawing the fabric cover thereover and into the channel; and a retainer means restrained within the channel by said guard means for resiliently compressing the fabric cover against the inner wall of the channel and thereby securing the fabric cover to the frame.

2. A fastening device for securing a fabric cover to a contoured seat as defined in claim 1, wherein said guard means includes an elongated extrusion having a longitudinal slot formed therein for receiving the peripheral edge of the frame.

3. A fastening device for securing a fabric cover to a contoured seat as defined in claim 2, Wherein said extrusion further includes a longitudinal ridge projecting into the channel opening, said ridge partially occluding the opening.

4. A fastening device for securing a fabric cover to a contoured seat as defined in claim 3, wherein said retainer means includes an elongated flexible member.

5. The improved method of securing a fabric cover to a seat frame having a marginal channel comprising the steps of:

a. manually attaching a flexible edge guard to the peripheral edge of the seat frame;
    b. positioning the cover on the frame;
    c. tucking the edge of the cover within the channel; and
    d. forcing a resilient retainer over the covering within the channel to draw the fabric cover taut and secure the cover to the frame.

* * * * *